United States Patent [19]
DeGrazia, Jr.

[11] Patent Number: 4,901,693
[45] Date of Patent: Feb. 20, 1990

[54] INTERLOCKED REMOTE OIL FILTER AND DRAIN

[76] Inventor: Torey W. DeGrazia, Jr., 1014 S. Greenwood Dr., Park Ridge, Ill. 60068

[21] Appl. No.: 373,150

[22] Filed: Jun. 28, 1989

[51] Int. Cl.⁴ .............................................. I01M 1/00
[52] U.S. Cl. ........................ 123/196 S; 123/196 A; 184/1.5
[58] Field of Search .......... 123/196 R, 196 S, 196 A; 184/1.5; 210/168

[56] References Cited

U.S. PATENT DOCUMENTS

| | | | |
|---|---|---|---|
| 3,049,334 | 8/1962 | Montague | 251/216 |
| 3,477,459 | 11/1969 | Schossow | 184/1.5 |
| 3,650,352 | 3/1972 | Schwary | 184/1.5 |
| 3,664,633 | 5/1972 | Schaffner | 251/294 |
| 3,954,250 | 5/1976 | Grace | 184/1.5 |
| 4,086,981 | 5/1978 | Mitsui | 184/1.5 |
| 4,319,664 | 3/1982 | Price et al. | 184/1.5 |
| 4,676,206 | 6/1987 | DeGrazia, Jr. | 123/196 S |

FOREIGN PATENT DOCUMENTS

| | | |
|---|---|---|
| 812693 | 5/1937 | France. |
| 1402262 | 6/1975 | United Kingdom. |
| 1448024 | 9/1976 | United Kingdom. |

*Primary Examiner*—E. Rollins Cross
*Attorney, Agent, or Firm*—Neuman, Williams, Anderson & Olson

[57] ABSTRACT

An improved interlocked remote oil filter and drain provides a system for draining oil from the oil sump of an engine. The system comprises an improved interlock that includes an interlock tab movable between a drain position to permit draining of the engine oil when the oil filter is not in place and a safe position to prohibit draining of the engine oil when the oil filter is in place. The interlock tab allows the convenient use of different sizes and shapes of oil filters.

9 Claims, 3 Drawing Sheets

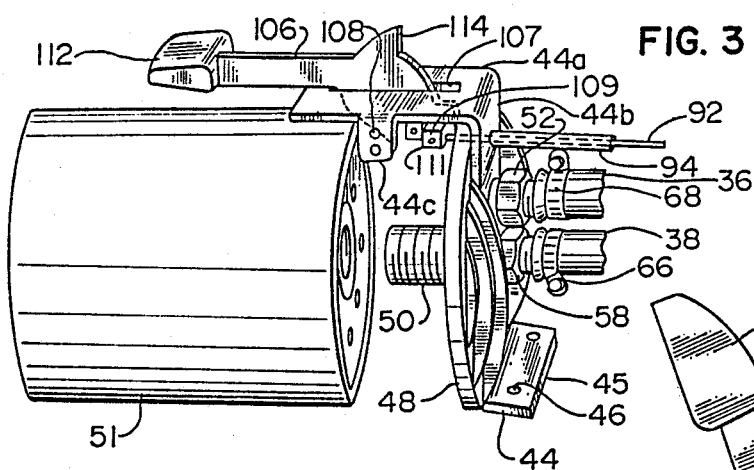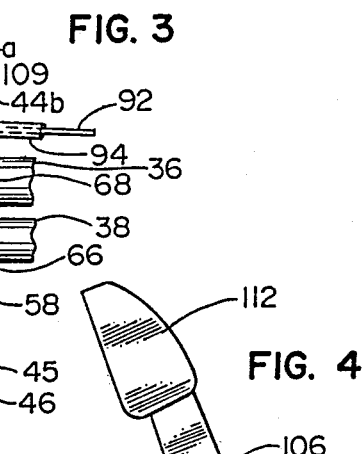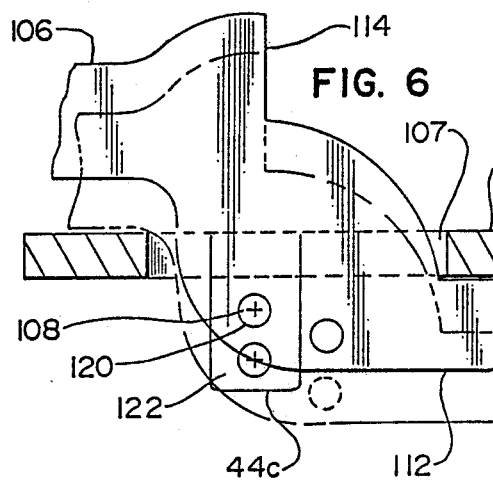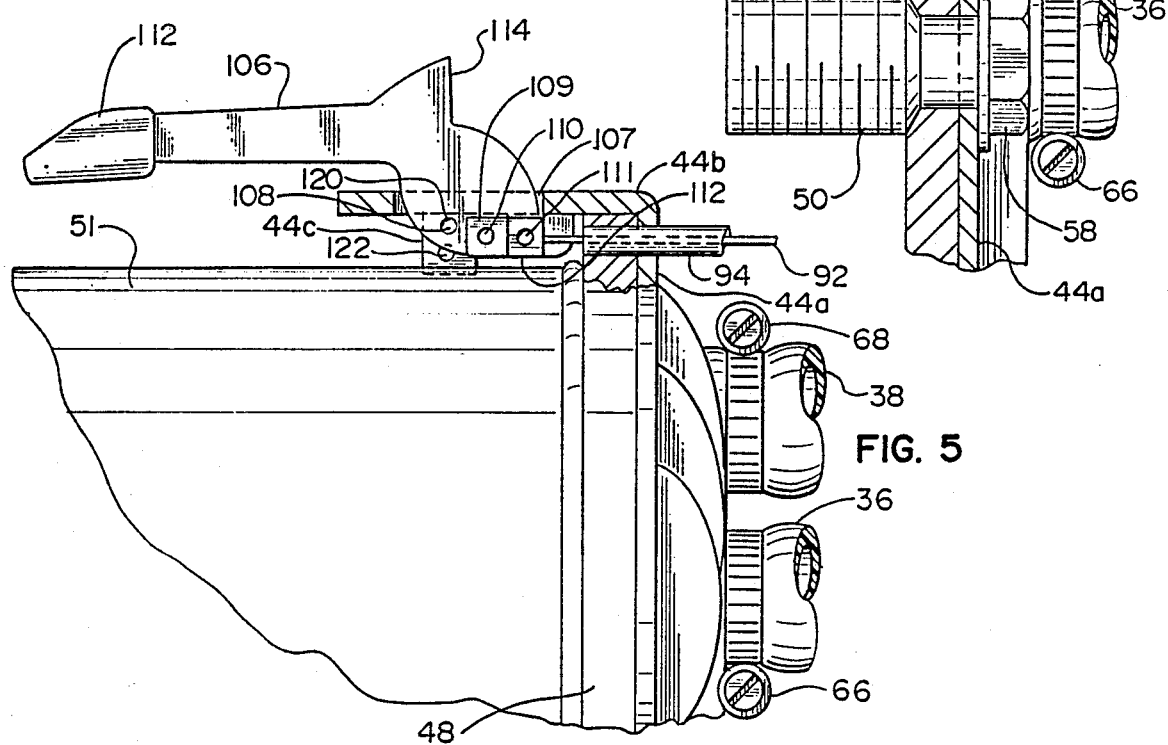

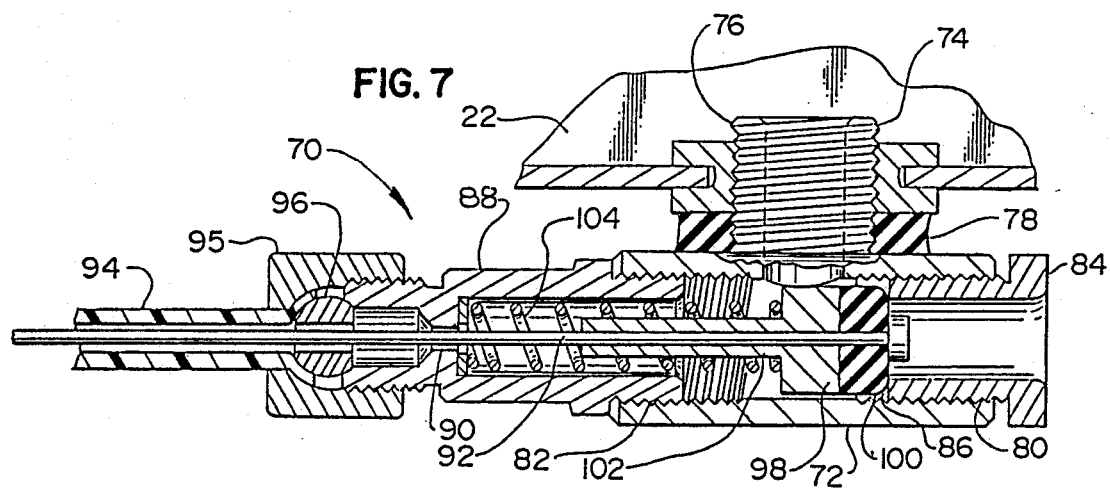

INTERLOCKED REMOTE OIL FILTER AND DRAIN

BACKGROUND OF THE INVENTION

Reference is made to U.S. Pat. No. 4,676,206 to Torey W. DeGrazia, Jr., which describes a system including an interlocked remote oil filter and remote drain control system on which the present invention is an improvement.

FIELD OF THE INVENTION

This invention relates to devices for servicing internal combustion engines and to maintenance related to changing the engine oil and oil filter cannister. More particularly, it relates to an improved apparatus for routine automobile maintenance which allows quick and efficient oil changing at a remote point from the drain plug of the oil pan. One aspect of the device is an improved interlocking mechanism which prevents draining of the engine oil while the oil filter cannister is in place and adjusts to accommodate oil filters of different configurations.

DESCRIPTION OF THE PRIOR ART

Typical engine lubrication system maintenance involves first removing the oil filter cannister from the oil filter attachment on the engine. The diminished size of a modern engine compartment often prevents easy access to the oil filter cannister when installed on the engine. The next step requires removing or manual manipulation of a drain plug from the oil drain outlet of the oil pan. This method usually requires the person draining the oil to either jack up the vehicle or to crawl underneath the vehicle to physically remove the drain plug. This procedure is quite time consuming and messy, and, moreover, is potentially dangerous.

A variety of devices to facilitate removal of the engine oil from a crankcase have been developed in which a special drain fitting replaces the sump drain plug. Such devices may be remotely-operated with a handle or knob to move the drain fitting to an open position to allow passage of the oil to a receptacle under the vehicle. However, inadvertent operation of such devices can easily occur when the handle is bumped or exposed to vibration from travel. Such inadvertent operation of remote oil changing devices either causes spilling oil on the ground without a receptacle in place and, possibly, damage to, or destruction of the engine.

It has been found highly desirable to provide a safety interlock for the remotely operated drain valve. In particular, the presence of the oil filter can be used as an interlock which is simple to use, allows quick changing of the oil but virtually precludes inadvertent dumping of the engine oil. The interlock of the invention will function so that the oil sump drain can only be operated when the oil filter is removed to assure that the engine is disabled. This is advantageous since modern practice generally includes changing both the oil and the filter at the same time. The interlock pursuant to this invention is relatively simple in construction and provides a reliable device that will operate effectively with constant use.

OBJECTS OF THE INVENTION

It is therefore an object of this invention to provide an improved system providing an interlocked remotely operated oil drain and oil filter which meets the stated objectives.

It is a specific object of this invention to provide a system for interlocking a remotely operated oil drain and oil filter which allows convenient use of differently configured oil filters.

A further object of the invention is to provide an interlocked remotely operated oil drain and oil filter system which may be quickly and easily mounted and that requires few parts and no modification to the engine.

Other objects, advantages and features of the present invention will become apparent upon reading the following detailed description and appended claims, and upon reference to the accompanying drawings.

SUMMARY OF THE INVENTION

In accordance with one embodiment of the invention, an improved system including an interlocked oil filter and drain device for draining oil from an internal combustion engine is provided. The system achieves the foregoing objects and includes adapter means coupled to oil filter attachment means on the engine. The adapter means enables the installation and operation of an oil filter at a remote point from the engine. A drain means to drain the engine oil includes cable means to move the drain means from a closed position to an open position to remotely control draining of the oil from the engine.

Interlock means precludes the actuation of the oil drain when the oil filter is installed in the adapter means. The interlock means includes a support frame located at a remote point from the engine such as on the fire wall and provides support for the adapter means and the engine oil filter. A control is provided on the support frame which includes an interlocking tab that engages a portion of the oil filter to preclude actuation of the control when a filter is in place. The control is coupled by a cable or the like to the drain means.

Preferably, the lever arm further includes a lever arm stop to limit travel of the lever arm when the lever arm is rotated by the actuating means. This feature prevents the drain means from moving beyond the open position when operated by the cable means.

A particular advantage of the system provides the capability of interlocking different sizes of oil filters. The support frame preferably includes a plurality of locations for receiving the lever arm axis of rotation to orient the locking tab in close relation to different sizes of oil filters.

DESCRIPTION OF THE DRAWINGS

For a more complete understanding of this invention, reference should now be made to the embodiments illustrated in greater detail in the accompanying drawings and described below by way of examples of the invention.

FIG. 3 is a perspective view of the remote oil filter and interlocking mechanism of the present invention.

FIG. 4 is a sectional view of the interlocking mechanism of FIG. 3 with the oil filter removed.

FIG. 5 is a sectional view of the interlocking mechanism of FIG. 3 with the oil filter secured to the oil filter adapter means of the present invention.

FIG. 6 is a detailed sectional view of the interlocking mechanism of FIG. 3 showing the adjustability of the interlocking mechanism to accommodate different sizes of oil filters.

FIG. 7 is a detailed sectional view of the remotely operated drain means of the present invention secured to the drain outlet of the engine oil sump.

DETAILED DESCRIPTION OF THE DRAWINGS

Figure 1:
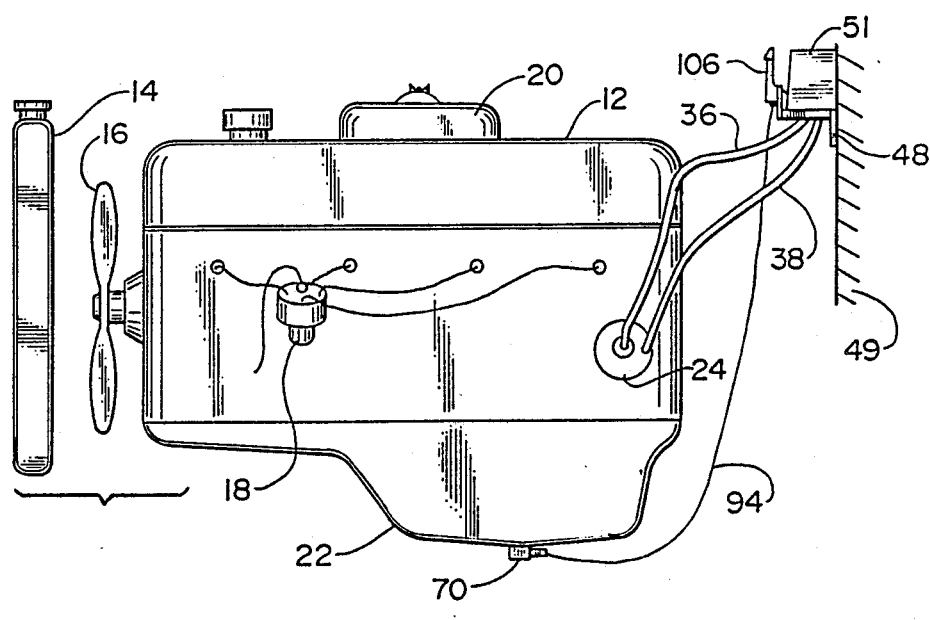
FIG. 1 is a simplified side view of the preferred embodiment of the present invention interconnected with an internal combustion engine.

Turning now to the drawings, FIG. 1 illustrates generally the improved interlocked remote oil filter and drain of the present invention designated by the numeral 10. FIG. 1 generally shows a simplified side view of the present invention installed in the engine compartment of an internal combustion engine 12. The engine may include a radiator 14, a fan 16, a distributor 18, an air cleaner 20, and an oil pan 22.

The device of the present invention includes an adapter plate 24 secured to an existing oil filter attachment means on the engine (not shown). A pair of by-pass hoses 36 and 38 extend from adapter plate 24 to a remote oil filter mounting plate 48 mounted on fire wall 49. A remote filter 51 is threaded to mounting plate 48 and a pull lever 106 is keyed to the mounting plate 48 in a manner which prevents actuation of the pull lever 106 when a filter cannister of any one of a plurality of configurations is in place. Lever 106 actuates remote drain 70 through a sheath 94 enclosing a control cable.

Figure 2:
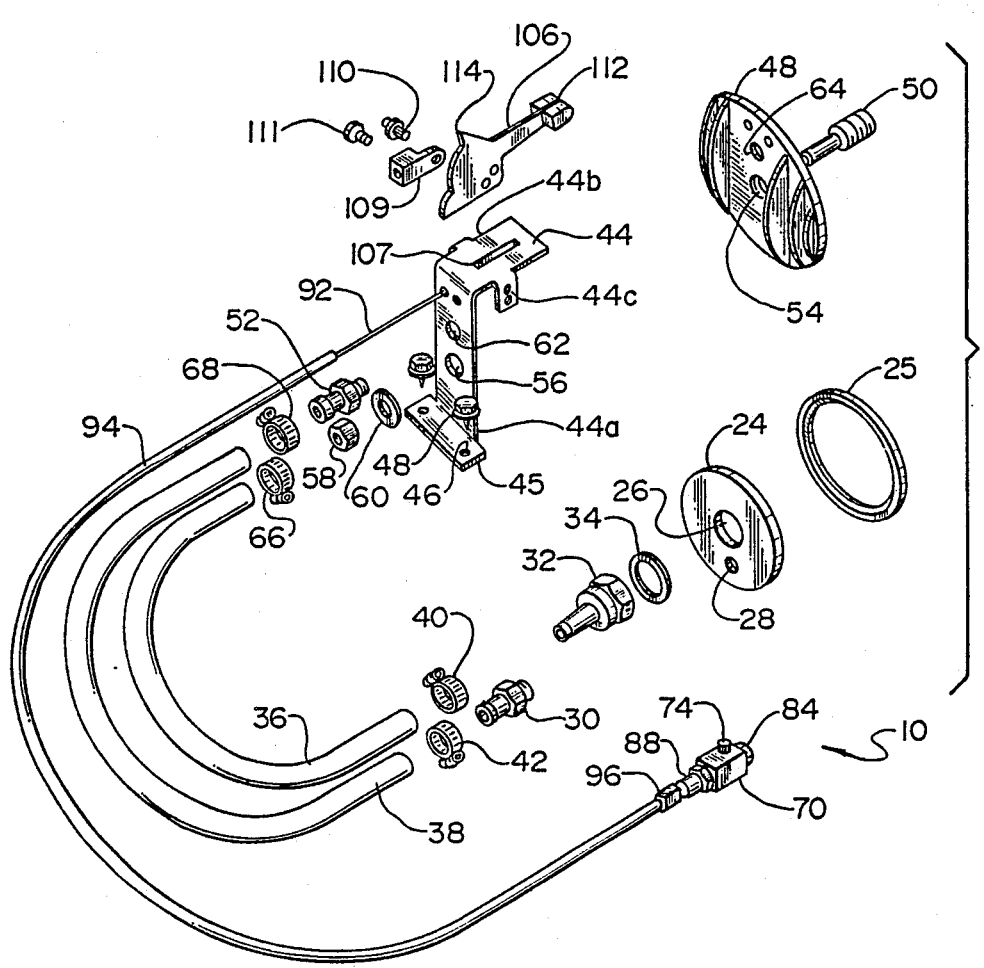
FIG. 2 is an exploded perspective view of the embodiment of FIG. 1 showing the interlocked remote oil filter and drain system of the present invention in greater detail.

As shown in FIG. 2 an O-ring sealing gasket 25 is provided with adapter plate 24 to form a seal between adapter plate 24 and the existing oil filter attachment means. Engine adapter plate 24 includes a central aperture 26 which is designed to fit over the threaded oil filter mounting screw (not shown) that conventionally secures an oil filter to the engine. A hollow shoulder nut 32 has an internally threaded surface adapted to mate with the threaded filter mounting screw. A suitable O-ring gasket 34 may be provided to form a seal between engine adapter plate 24 and shoulder nut 32. A threaded return oil hole 28 is also provided in engine adapter plate 24 for reception of a threaded hose fitting 30.

The bypass hoses 36 and 38 mate with the shoulder nut 32 and hose fitting 30 and are sealed thereto with a pair of hose clamps 40 and 42. Bypass hose 36 forms the inlet of the remote oil filtering device. Bypass hose 38 forms the return of the remote filtering device.

The oil filter adapter means of the present invention is likewise illustrated in FIG. 2. The adapter means is supported by a frame member 44 that is secured to an appropriate remote point from the engine convenient for manual operation. Frame member 44 is preferably L-shaped and includes a longitudinal leg 44a and a transverse leg 44b. Frame member 44 also includes a flange 45 located opposite transverse leg 44b and having holes, including holes 46 for receiving threaded screws 48 that may be secured to the fire wall nor other structural member of the engine compartment. Oil filter mounting plate 48 is secured to frame member 44 with the use of a center fitting 50 threaded for a filter canister having a distal end threaded to receive a securing nut 58. It will be understood by those skilled in the art that oil filter mounting plate 48 and frame member 44 may be implemented as a single unit. Center screw 50 fits within openings 54 and 56 of oil filter mounting plate 48 and the longitudinal leg 44a of frame member 44, respectively. Securing nut 58 and washer 60 are used to fasten center screw 50, thereby securing frame member 44 and mounting plate 48 together. A hose fitting 52 similarly fits within opening 62 in frame member 44 and mates with a threaded opening 64 in oil filter mounting plate 48.

Center fitting 50 is adapted to receive oil filter cannister 51 (FIG. 3) and hose fitting 52 is adapted to provide the oil filter return of the adapter means for filter 51. Center fitting 50 is coupled to the engine oil filter mounting with the use of bypass hose 36. Bypass hose 36 is interconnected with center fitting 50 with the use of a hose clamp 66. Hose fitting 52 is similarly coupled to the engine oil filter return with bypass hose 38 that is connected to hose fitting 52 with hose clamp 68. Oil filter cannister 51 thereby performs the same filtering function as if it were attached to the oil filter attachment means on the engine.

The drain means of the present invention is most clearly illustrated in FIG. 7. A remotely operated drain valve 70 includes a valve body defining a longitudinal fluid passageway 72 and a transverse section 74 defining a transverse fluid passageway. The transverse section 74 communicates with the engine oil in the oil pan 22 and includes a threaded portion 76 to fit within the drain outlet of the oil pan 22 after the removal of a conventional oil plug. A gasket washer 78 surrounds transverse section 74 and abuts against the edge of a bushing 71 in the oil pan 22 and the longitudinal section 72 of the drain valve 70.

The longitudinal section 72 of drain valve 70 includes two substantially identical connecting means at the opposite ends of longitudinal section 72, shown as threaded ends 80 and 82. An outlet sleeve 84 fits within one of the threaded ends 80 to provide the outlet of the drain valve. The inward edge 86 of outlet sleeve 84 forms a sealing surface in longitudinal section 72. A closure member or cable end fitting 88 mates with the other threaded end 82 of longitudinal section 72. Cable end fitting 88 includes an aperture 90 for receiving an actuating cable 92. Cable 92 is enclosed with a sheath 94 and is fastened to the cable end fitting 88 with the use of a cable end farrell 95 and cable end nut 96. Identical threaded ends 80 and 82 allow the cable end fitting 88 to mate at either end of longitudinal section 72. This feature is particularly advantageous when drain valve 70 is mounted to the side of oil pan 22 since one of the ends of longitudinal section 72 may be directed upwardly when the transverse section 74 of drain valve 70 is securely threaded within the oil pan 22.

A valve plunger 98 is placed within longitudinal section 72 and includes a generally cylindrical sealing head 100 and elongated portion 102 that are attached to the actuating cable 92. A valve spring 104 as well as oil pressure within longitudinal section 72 and cable end fitting 88 bias the sealing head 100 toward a normally closed position against the sealing surface 86 of the outlet sleeve 84. The valve plunger 98 is loosely fit within longitudinal section 72 to increase the oil pressure within the longitudinal section 72. This arrangement increases the life of drain valve 70 since valve plunger 98 is less subject to sticking or wear against the inside surface of longitudinal section 72. In the open position, valve plunger 98 is withdrawn from the sealing surface 86 of outlet sleeve 84 by cable 92. A flow path between the inlet passage of transverse section 74 and outlet sleeve 84 is thereby provided for the oil being drained from oil sump 22.

The novel interlocking means of the present invention is shown most clearly in FIGS. 3 through 6. The interlocking means comprises a drain locking lever arm 106 that fits within a slot 107 in the transverse leg 44b of frame number 44. Lever arm 106 is pivotally mounted on frame member 44 about an axis of rotation 108 defined by a pin 107 passing through a pair of tabs 44c on frame 44. The lever arm is disposed in close relation to the oil filter mounting plate 48. Axis of rotation 108 is spaced radially from the axis of the oil filter cannister 51 when the oil filter cannister 51 is secured to mounting plate 48.

The drain actuating cable 92 is attached to one end of lever arm 106 spaced from lever arm axis 108 with the use of a cable attaching block 109. Cable attaching block 109 is pivotally mounted to lever arm 106 about a pivot pin 110. Drain actuating cable 92 is secured to cable attaching block 109 with the use of securing screw 111. When the actuating cable 92 is secured to lever arm 106, the rotation of lever arm 106 about axis 108 displaces cable 92.

The actuating means of the present invention, shown as pull knob 112, is located at the distal end of lever arm 106 opposite lever axis of rotation 108 and the cable attaching block 109. Locking lever arm 106 is thereby manually operated. The manual rotation of drain locking lever 106 about axis 108 allows the actuation of the drain means of the present invention. As locking lever arm 106 is rotated about axis 108, drain actuating cable 92 withdraws valve member 98 from the outlet sleeve sealing surface 86, thereby permitting exhaustion of the oil. As shown in FIG. 4, locking lever 106 includes a locking lever stop 114 that limits travel of lever arm 106 when the lever arm is rotated. Locking lever stop 114 abuts against the surface of the transverse leg 44b of frame member 44 to limit travel of locking lever 106. This feature prevents cable 92 from withdrawing the valve member beyond the open position in drain valve 70.

Rotation of locking lever arm 106 in the opposite direction urges the valve member 98 of drain valve 70 toward a closed position. There is slight overtravel of arm 106 to toggle the valve head to the closed position. In this position, actuating cable 92 urges the sealing head 100 of valve member 98 against the sealing surface 86 of outlet sleeve 84.

FIG. 5 shows the interlocking feature of the present invention. When an oil filter cannister 51 is secured to oil filter mounting plate 48, an interlocking tab 112 is adjacent to or abuts the surface of the oil filter cannister 51. Interlocking tab 112 is attached to the end of lever arm 106 opposite pull knob 112 and lever arm axis of rotation 108. Interlocking tab 112 is preferably positioned in the vicinity of the base of oil filter cannister 51 to insure that locking tab 112 is disposed in close relation to oil filter canisters of differing heights. Since the interlocking tab 112 is adjacent to the oil filter cannister, the locking lever arm 106 may not be inadvertently pulled to rotate about axis 108. This feature prevents actuation of the drain means of the present invention unless the engine is disabled and the oil filter cannister 51 is removed. Moreover, the locking lever tab 112 prevents opening the drain means by vibration or accidental bumping.

FIG. 6 illustrates a feature that provides additional adaptability of the present invention. As shown in FIG. 6, a mounting tab 44c may have multiple spaced apertures so that the locking lever arm 106 and locking lever arm pivot 108 may be adjusted to provide suitable locking positions for different sizes of oil filter canisters. Mounting holes 120 and 122 permit locking arm pivot 108 and interlocking tab 112 to be radially positioned relative to the axis of the oil filter 51. In this way, the interlocking mechanism may conveniently adapt to oil filters of various diameters.

Thus an improved device for allowing quick and efficient oil changing has been provided which meets the aforestated objects. The device provides an interlocked oil drain and filter that allows convenient use of different sized oil filters. Further the improved device is simple to manufacture and to use.

What is claimed:

1. In an interlocked oil filter and drain system for draining oil from an internal combustion engine having a sump for holding oil and oil filter attachment means associated with the engine, said system including adapter means coupled to the attachment means for enabling installation and operation of an oil filter at a remote point from the engine, drain means including a drain valve interconnected with the sump for draining the oil, the drain means including actuating means for enabling draining of the oil from the remote point without removal of the drain means, and interlock means precluding operation of the drain means when the oil filter is operatively associated with said adapter means, the interlock means comprising:

a support frame located at the remote point for supporting the adapter means and the oil filter;

control means operatively associated with said support frame having an interlock tab movable between a drain position and a safe position, said interlock tab when in the drain position occupying space normally occupied by the oil filter and when in said safe position occupying space remote from the oil filter in its operative position; and attaching means for securing said actuating means to said control means.

2. The system of claim 1 wherein said actuating means includes a flexible cable operatively connected between the drain means and said attaching means.

3. The system of claim 2 wherein said control means includes a lever arm rotatably mounted on said support frame and carrying said interlocking tab.

4. The system of claim 2 wherein said drain valve comprises:

a valve body defining a longitudinal fluid passageway therein, said body having a pair of substantially identical connecting means located at the opposite ends of said passageway;

said valve body further including a transverse section, said transverse section defining a transverse passageway in communication with said fluid passageway, an having connecting means adjacent the distal end of said transverse section for providing fluid communication between said transverse passageway and said fluid reservoir;

an outlet sleeve joined with the connecting means at one end of said body, said outlet sleeve having an annular sealing surface disposed adjacent said one end, said outlet sleeve defining a longitudinal outlet port;

a closure member having a portion operatively connected to the connecting means of the other end of said body, said closure member cooperating with said longitudinal section to define a valve chamber;

a valve member disposed within said longitudinal passageway for longitudinal motion between an open position and a closed position, said valve member including a generally cylindrical sealing head for forming a seal with said sleeve sealing surface when said valve member is set to said closed position; and a biasing spring between said closure member and said sealing head, said biasing spring cooperating with fluid in said valve chamber to urge said valve member to the closed position wherein said flexible cable extends longitudinally through said closure member and interconnects with said valve member for withdrawing said sealing head from said sealing surface to said open position.

5. In an interlocked oil filter and drain system for draining oil from an internal combustion engine having a sump for holding oil and oil filter attachment means on the engine, adapter means coupled to the attachment means for enabling installation and operation of an oil filter at a remote point from the engine, drain means interconnected with said sump for draining the oil, the drain means including cable means for enabling draining of the oil from the remote point without removal of the drain means, and interlock means precluding operation of the drain means when the oil filter is installed, the interlock means comprising:

a support frame located at the remote point for supporting the adapter means and an oil filter;

a lever arm rotatably mounted on said support frame and having an axis of rotation between its ends, said axis of rotation transverse the oil filter;

cable attaching means located at one end of said lever arm for securing said cable means to said lever arm;

actuating means attached to the end of said lever arm opposite said axis of rotation and said cable attaching means for rotting said lever arm to operate the cable means; and an interlocking tab attached to the end of said lever arm opposite said actuating means, for engaging the outside cylindrical surface of the oil filter to impede the rotation of said lever arm when the oil filter is mounted to the adapter means.

6. The system of claim 5, wherein said support frame includes a plurality of locations for receiving said lever arm axis of rotation to engage said interlocking tab with different diameters of oil filters.

7. The system of claim 5, wherein said interlocking tab is radial outward of the outside cylindrical surface of the oil filter in the vicinity of the base of the oil filter to engage said interlocking tab irrespective of the height of the oil filter.

8. The system of claim 5, further comprising a lever arm stop for limiting travel of said lever arm when said lever arm is rotated by said actuating means toward the open position.

9. The system of claim 5, wherein said actuating means includes a pull knob for manually rotating said lever arm to operate the cable means.

* * * * *